July 13, 1937.  R. R. HAYS  2,086,803
DIFFERENTIAL MECHANISM FOR ROTATIVE WING AIRCRAFT
Filed June 26, 1936  3 Sheets-Sheet 2

Inventor
Russell R. Hays

July 13, 1937.    R. R. HAYS    2,086,803
DIFFERENTIAL MECHANISM FOR ROTATIVE WING AIRCRAFT
Filed June 26, 1936    3 Sheets-Sheet 3

Inventor
Russell R. Hays

Patented July 13, 1937

2,086,803

UNITED STATES PATENT OFFICE 2,086,803

DIFFERENTIAL MECHANISM FOR ROTATIVE WING AIRCRAFT

Russell R. Hays, Wellsville, Kans.

Application June 26, 1936, Serial No. 87,338

10 Claims. (Cl. 244—17)

This invention relates to aircraft having sustaining rotors and more particularly to eccentrically operated devices for differentially and asymmetrically varying the pitch of such rotors, being a continuation in part of my co-pending application, Hinge differential for rotative wing aircraft, Serial Number 86,473, filed June 22, 1936.

In the above numbered application I have provided an asymmetrical pitch varying mechanism for rotors having articulatively mounted blades, and in this application it is my intention to provide a mechanism for rotors not having articulative or universally mounted blades, to vary their pitch at different moments of rotation in a similar manner.

The invention in this instance resides largely in the combination of a reciprocating and a swinging, or alternating, movement as a means of pitch variation, both of which movements are independent of articulation of the blade; rather than in the specific mechanism described since with knowledge of the basic principles involved in such a planetary, or partially planetary system, any number of widely different mechanisms may be constructed to achieve this same purpose.

This becomes more apparent when one considers the wide variety of mechanisms for achieving pitch variation which have been used, or which have been proposed for use, all of which are based upon a reciprocative movement set up by an eccentric of one sort or another to the rotor shaft. Such eccentric pitch varying mechanisms are characterized by an equal increase and decrease in pitch of the blades at opposed moments of rotation, and by the fact than an equal pitch of opposed blades occurs at moments of rotation intermediate to those of maximum and minimum pitch variation.

Such mechanisms are open to criticism in that they do not provide a sufficiently wide range of pitch variation at different moments of rotation, even when one system is superimposed upon another one, as for instance: an articulative feathering blade, or an eccentrically controlled pilot plane, since they are still subject to the characteristics cited above. Whereas, it has been found that an asymmetrical pitch varying mechanism which provides a maximum and minimum pitch setting within approximately 90 degrees of rotation of the blade about the rotor axis is more satisfactory both from the standpoint of efficiency and of smoothness of operation.

To achieve this wider range of pitch variation it has been found to be necessary to add a new element to the eccentric used heretofore; as for instance, a planetary, or a swinging, or an alternating movement which acting in conjunction with the reciprocating movement used heretofore produces a change in the mean pitch of the rotor system at different moments of rotation, a change in the rate of feathering at opposed moments of rotation, and provides maximum and minimum pitch settings of the blades within less than 180 degrees of each other in terms of rotation of the blade about the main rotor axis.

Therefore, the object of this invention is broadly the provision of a pitch varying mechanism for rotors having feathering blades in which such a planetary, swinging, or alternating movement is provided in conjunction with an eccentric or reciprocating movement for asymmetrically varying the pitch of the blades, all these movements being provided independently of any articulation of the blades.

Another object is the provision of a control for such a mechanism in order to render it operative or inoperative and to provide rolling and pitching moments in the rotor as the need for them may arise.

Another object is the provision of a rotary movement resultant to a fixed point offset relative to the rotor axis and producing a reciprocating movement which is transferred to the free end of a bar pivoted for swinging movement, the pitch of the blade being taken from the position of a bar intermediate to the relative rotary movement of the offset point and the free end of the pivoted bar.

Still another object is the provision of a mechanical train for carrying the relative angular movement of the intermediate bar to a fixed line, to the journaled end of a blade, thereby varying the pitch of the blade by a degree substantially the same as the angles made by the intermediate bar with the fixed line.

Yet another object is the provision of two such mechanical trains, one contained substantially within the other and both symmetrically to the rotor axis, whereby movement of a single control point increases or decreases asymmetrical pitch variation of a plurality of blades simultaneously.

Another object is the provision of a control bar mounted for both vertical travel and for turning, either independently or simultaneously, so that the position of the offset point setting up a rotary movement for a plurality of asymmetrical blade varying mechanisms may be changed relative to the rotor axis.

Ancillary objects will become apparent in reading the following description in conjunction with the accompanying drawings in which.

Figure 1:
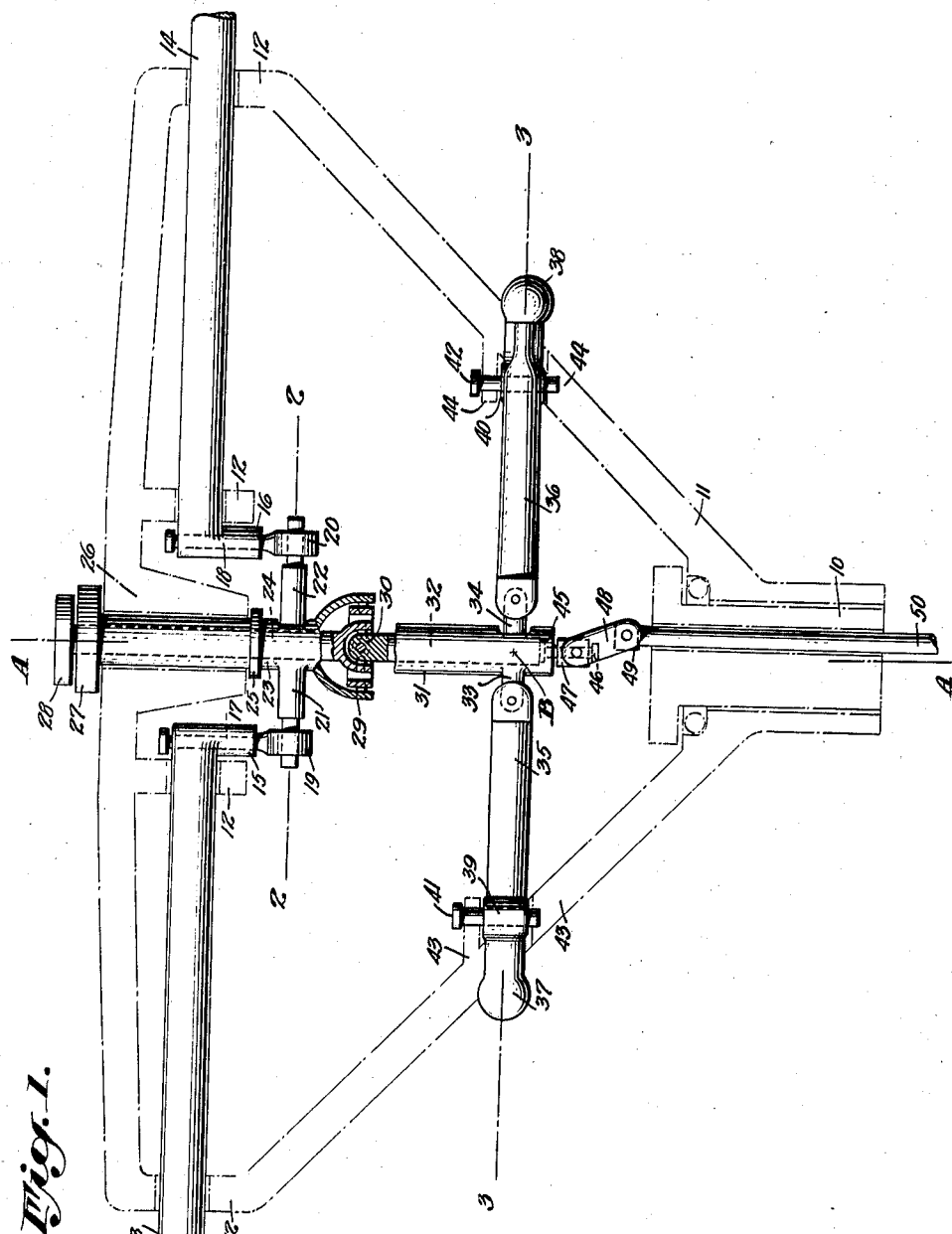
Figure 1 is a vertical transverse section through a rotor hub showing the working portions of an asymmetrical pitch varying mechanism for feathering blades such as is embodied in this invention.
Figure 4:
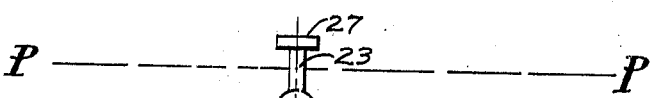
Figure 4 is a somewhat diagrammatic view in vertical transverse section showing the control mechanism in detail.
Figure 5:
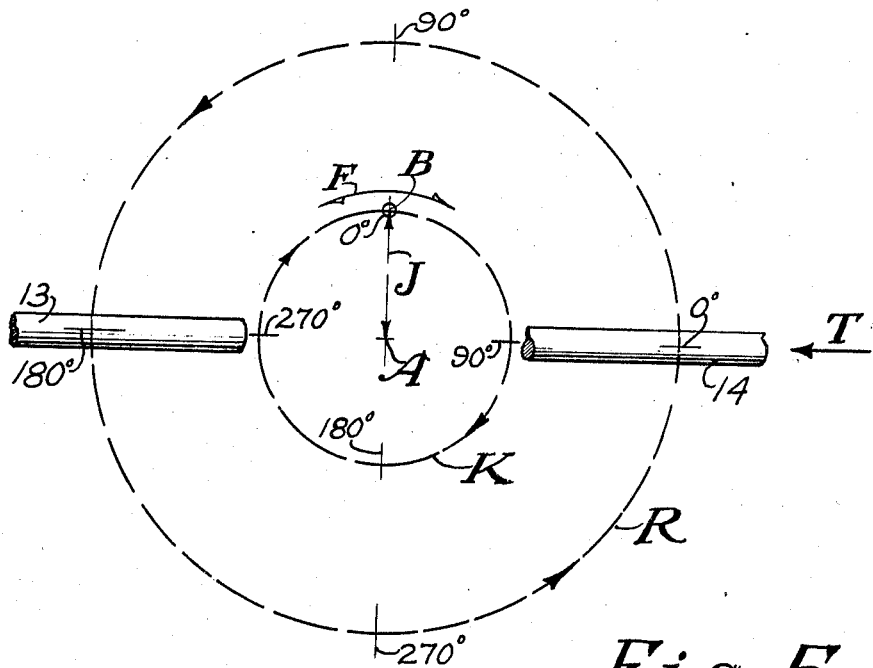
Figure 6:
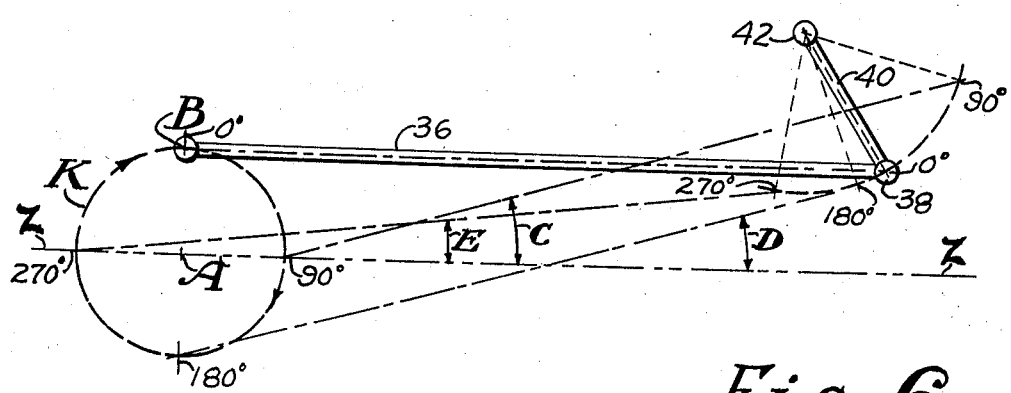

Figure 5 is a diagrammatic plan view showing the direction of travel and of rotation of the rotor in conjunction with an eccentric point utilized as a control means taken along the line 5—5 of Fig. 4, and Figure 6 is a diagrammatic plan view along the line 3—3 of Fig. 1 of a single asymmetrical pitch varying mechanism showing the relative changes in pitch produced at different moments of rotation of the rotor blade.

Similar numerals refer to similar parts throughout the several views.

Referring to Fig. 1, a rotor shaft 10 fixed in a conventional manner to the fuselage of the aircraft, has the revolvable rotor head 11 journaled on it by suitable bearings. The bearings 12—12—12—12 of the rotor head have journaled in them the symmetrically disposed blade butts 13 and 14 held in position by the shoulders 15 and 16 respectively which carry journaled pins 17 and 18 having the slotted heads 19 and 20 respectively.

Figure 2:
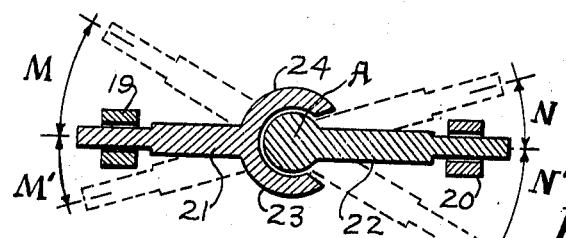
Figure 2 is a detail transverse section taken along the line 2—2 of Fig. 1.

The slotted heads 19 and 20, Fig. 2, of the journaled pins movably hold the reduced ends of the lever arms 21 and 22 respectively, which are fixed to the concentric shafts 23 and 24 respectively, so that angular movement of the lever arms 21 and 22 about the rotor axis A—A through the angles N—N' and M—M' act through the pins 17 and 18 to turn the blade butts 13 and 14 by an approximately similar degree, thereby varying the pitch of the blades in like degree.

The shoulders 25 and 27 hold the shaft member 23 in a bearing 26 axially located in the rotor head 11, and the concentric shaft member 24 is journaled inside the shaft 23 and held by the shoulders 28 and 46, a section of the outer shaft member 23 being cut away to allow the projection and movement of the lever arm 22 of the inner shaft 24 through the angles N—N', and all parts are freely journaled to permit independent movement of the respective shafts and lever arms.

Figure 3:
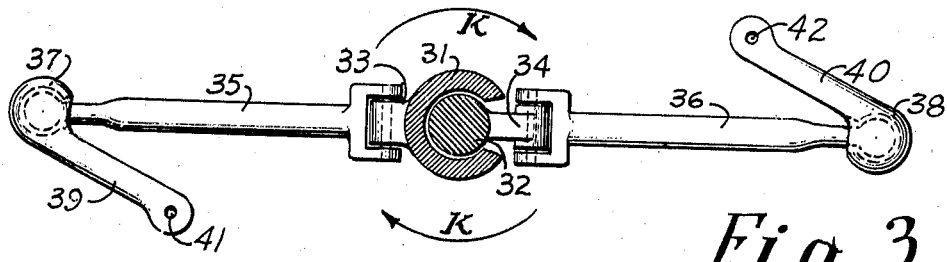
Figure 3 is a detail transverse section taken along the line 3—3 of Fig. 1 showing the pitch determining mechanism.

The lower ends of the concentric shafts 23 and 24 are independently joined to the concentric shafts 31 and 32 respectively, by the universal connections 29 and 30, the universal 29 being cut away in part to show that it and the contained universal 30 operate about a common center point lying on the rotor axis A—A. The lower end of the outer shaft 31 carries a horizontal projection 33 and its opposite side is cut away to allow a similar projection 34 from the inner shaft 32, Fig. 3, a degree of angular movement equivalent to the angles N—N' of Fig. 2. Symmetrically disposed horizontal pins hinge the projections 33 and 34 to the identical radially extending bar members 35 and 36 respectively, the outer ends of which are joined by ball and socket joints 37 and 38 respectively to the identical bar members 39 and 40 held by the vertical pins 41 and 42 respectively in the journal portions 43 and 44 respectively of the rotor head 11, all parts being symmetrically disposed and freely operative so that angular movement of the intermediate bar members 35 and 36 produces a corresponding rotary pitch varying movement of the blade butts 13 and 14 respectively.

A reduced end portion of the shaft 32 projects through and past the end of the shaft 31 and has the head 46 holding the bearing 47 on the projecting end portion thereof. Horizontally and centrally disposed trunnions hold the bearing 47 in the upper end of the bar member 48, the lower end of which is hinged by a pin parallel to the trunnions to a head 49 of the control shaft 50 which is suitably journaled off center in the rotor shaft 10 for both vertical travel and for rotary motion by suitable manually controlled levers in the cockpit of the craft as is well known to the art.

In operation, vertical movement of the control bar 50 through the distance L, Fig. 4, is seen to cause angular disalignment with the axis A—A through a distance J of the concentric shaft members 31 and 32 pivoted to the universal joints 29 and 30. When such disalignment occurs, the point B contained by the articulative shaft members 31 and 32 is offset relative to the rotor axis A—A, so that with rotation of the rotor head it describes a circle K about the rotor axis A—A relative to a point on the rotor head.

As such times, the shaft projection 45 turns freely in the bearing 47, this being the point at which the control operates to vary the position of the feathering mechanism which turns as a unit with the rotor head.

Since the intermediate bar 36, Fig. 5, is pivoted at the point B, rotation of B about the circular path K will set up a reciprocative movement of the intermediate bar along the line of the bar's mean radial position. Hence, with the outer end of the intermediate bar joined pivotally to the free end of the pivoted bar member 40, the radial component of the reciprocative travel of the intermediate bar 36, sets up a transverse reciprocative movement through swinging of the bar member 40 about the fixed pivot 42.

When this occurs the angular positions of the intermediate bar 36 to a radial line Z—Z, Fig. 6, cease to be bilaterally symmetrical, and instead become asymmetrical by a degree dependent upon the relative values of; the radius of the circle K, the length of the intermediate bar, the radius of the arc described by the ball and socket joint 38, and the angle made by the mean radial position of the intermediate bar with the mean position of the bar member 40.

Although this asymmetrical movement is comparatively simple mechanically, certain characteristics of such movement become evident from closer consideration of Figs. 5 and 6. The first, is that through its connection with the intermediate bar 36, the rotation of the point B about the circle K is in effect an eccentric, co-acting with another eccentric or alternating movement about the pivot 42; and, in this connection, it should be noted that relative to a line through the points A and 42 the resultant circular travel about these two points is in opposite directions, being in this respect a planetary system, more particularly so since one axis is offset relative to the other, and since the radii of the arcs described are of different values.

With travel of the point B about the point A, the intermediate bar 36 moves from a minimum angle, or parallel position, to the line Z—Z; to a maximum angle C during 90 degrees of travel about the point A; with 180 degrees of travel about the point A, this angle decreases to an angle D, and with 270 degrees of travel, further decreases to an angle E; with the result that the minimum and maximum angular positions of the intermediate bar 36 to the line Z—Z occur during 90 degrees rotation of the point B about the point A, and hence the maximum and minimum pitch settings of the accompanying blade occur simultaneously during 90 degrees of rotation about the main rotor axis.

To orient the pitch varying mechanism with the blade, the point of minimum angular position of the intermediate bar, occurring at 0 degrees rotation about the axis A—A, is set ahead 90 degrees in the direction of the blade's rotation, Fig. 5, from the point 0 degrees on the circle R, or forward moments of the blade's rotation at which time a minimum pitch setting is desired.

Inasmuch as this orientation and the relative proportions of the parts of the pitch varying mechanism are such as to provide the most efficient asymmetrical feathering of the blades at the rotor's normal cruising speed; and since the control bar is effective not only in moving the point B through the distance J, but also along the path F, Fig. 5, it follows that the point B may be made to lie anywhere within the maximum value of the circle K; and therefore is not only operative to produce the desired feathering at such a cruising speed, but also at intermediate translatorial speeds, in conjunction with adequate control at all times.

Therefore, what I claim is:

1. In an aircraft having a bladed sustaining rotor, an asymmetrical pitch varying mechanism including a universally mounted shaft, operatively connected to a blade, a control bar mounted for simultaneous vertical and rotary movement, a link connecting said bar to one end of said shaft by a pivot bearing so that the universally mounted shaft member may be urged to any point within a control circle the center of which contains the rotor axis.

2. In an aircraft having a bladed sustaining rotor and a hub therefor, an asymmetrical pitch varying mechanism for the individual blades comprising a plurality of universally joined shaft members, one of which is journalled in the rotor hub structure and about the rotor axis, means for moving the free end of the unjournalled shaft off center relative to the rotor axis, a lever pivoted at one end to the rotor hub, a bar member connected at one end to said movable shaft member and operatively joined at its other end to the free end of said lever whereby angular movement of the bar is transferred through the shaft members to the butt of a blade of the rotor pivotally secured in the hub structure, whereby said angular movement of the bar acts to vary the pitch of the blade.

3. In an aircraft having a bladed sustaining rotor, an asymmetrical pitch varying mechanism including a bar member pivotally secured to a universally mounted shaft member, and the outer end of said bar member joined by a ball and socket joint to another bar member mounted for pivotal movement about a vertical axis, whereby movement of the shaft member produces movement of the bar member pivoted about the vertical axis.

4. In an aircraft having a bladed sustaining rotor, an asymmetrical pitch varying mechanism comprising a plurality of universally joined shaft members contained within a functionally similar plurality of universally joined shaft members, whereby asymmetrical movement of symmetrically disposed pitch varying mechanisms acts simultaneously along the rotor axis to vary the pitch of symmetrically disposed blades journaled in the hub structure.

5. In an aircraft having a bladed sustaining rotor, an asymmetrical pitch varying mechanism including a plurality of concentric shaft members journaled for independent movement about the rotor axis, concentric universal joints intermediate said journaled shaft members and similar concentric shaft members, a bearing journaled on the free end of one of the unjournaled shaft members, and means operatively associated with said bearing whereby said bearing may be with said desired position from the rotor offset in any desired position from the rotor axis by means of a single manually controlled bar.

6. In an asymmetrical pitch varying mechanism for adjusting the pitch of the blades of a variable pitch rotor, blades pivotally mounted on a rotatable hub, a member, means for moving one end of said member in a closed path, means for moving the other end in an arcuate path, and means for transmitting motion from an intermediate point on said member to adjust the pitch of said blades.

7. In an asymmetrical pitch varying mechanism for adjusting the pitch of the blades of a variable pitch rotor, blades pivotally mounted on a rotatable hub, a member, means for moving one end of said member in a closed path, means for moving the other end in a transitory path, and means for transmitting motion from an intermediate point on said member to adjust the pitch of the individual blades.

8. In an asymmetrical pitch varying mechanism for adjusting the pitch of the blades of a variable pitch rotor, blades pivotally mounted on a rotatable hub, a member, means for moving one end of said member in a transitory path, means for moving the other end of said member in a transitory path not parallel to the first path, and means for transmitting motion from an intermediate point on said member to adjust the pitch of the individual blades.

9. In an asymmetrical pitch varying mechanism for adjusting the pitch of the blades of a variable pitch rotor, blades pivotally mounted on a rotatable hub, a member, means for moving one end of said member in a transitory path, means for moving the other end of said member in a transitory path not parallel to the first path, one of said motions manually controlled and the other entirely by rotation of the rotor, and means for transmitting motion from an intermediate point on said member to adjust the pitch of the individual blades at varying phases of their rotation about the main rotor axis.

10. In an asymmetrical pitch varying mechanism for adjusting the pitch of the blades of a variable pitch rotor, blades pivotally mounted on a rotatable hub, a member, a device for moving one end of said member in a closed path and manual means for controlling this movement, means for moving another part of said member in a transitory path, and means for transmitting motion from an intermediate point on said member to adjust the pitch of the individual blades at different phases of rotation about the main rotor axis.

RUSSELL R. HAYS.